United States Patent

[11] 3,632,195

| [72] | Inventor | Walter E. Strimling |
| | | 63 Westcliff Road, Weston, Mass. 02193 |
| [21] | Appl. No. | 850,816 |
| [22] | Filed | Aug. 18, 1969 |
| [45] | Patented | Jan. 4, 1972 |

[54] OPTICAL READER
12 Claims, 8 Drawing Figs.

| [52] | U.S. Cl. | 353/25, 178/6 R, 353/109 |
| [51] | Int. Cl. | G03b 23/04 |
| [50] | Field of Search | 353/26, 25, 27, 109; 178/6 |

[56] References Cited
UNITED STATES PATENTS

| 2,295,000 | 9/1942 | Morse | 178/6 R X |
| 2,323,372 | 7/1943 | Bryce | 353/26 |
| 2,563,893 | 8/1951 | Waller et al. | 353/109 |
| 3,071,753 | 1/1963 | Fritze et al. | 353/27 X |
| 3,146,667 | 9/1964 | Mulch | 353/25 X |
| 3,290,987 | 12/1966 | James et al. | 353/26 |
| 3,322,027 | 5/1967 | Forbes et al. | 353/109 |

*Primary Examiner*—William D. Martin, Jr.
*Attorney*—Herbert M. Shapiro

ABSTRACT: A pair of closed loop tracks provides a stationary slideway for slide (transparency) holders which are hinged together sequentially in an endless loop arrangement. A particular slide is selected for viewing by advancing the holders in the slideway to a viewing position at which the selected slide is reoriented from a normally radial to a peripheral orientation. Illumination from a source at the axis of the slideway permits viewing without extraction of the slide from the track.

INVENTOR
W. E. STRIMLING

PATENTED JAN 4 1972

OPTICAL READER

FIELD OF THE INVENTION

This invention relates to information retrieval and processing apparatus and more particularly to such apparatus adapted for the reading of slide transparencies.

BACKGROUND OF THE INVENTION

Carousel-type slide projectors are well known in the art. Slides are stored in fixed radially oriented racks in a carousel-shaped carriage. The carriage is rotated controllably to a position from which a selected slide is extracted for projection as is well understood. Each slide is capable of storing considerable information, but access time for each slide is low.

An object of this invention is to provide a slide projector with improved accessing time.

BRIEF DESCRIPTION OF THE INVENTION

A pair of spaced-apart tracks is herein adapted to provide a closed slideway for an endless loop arrangement of hinged-together slide holders. The slideway is of a generally circular geometry with a noncircular portion which defines a viewing position. The slide holders are closely stacked in the slideway to provide high-storage capacity and are free to move within that slideway. An input code selection causes motion to be imparted to all slide holders within the slideway except those at a viewing position. Slides in the viewing position are pulled along by the movement of the other slides. A counter tracks the slide holders and provides position information for comparison with the input code for positioning a selected slide holder in the viewing position. The positioning of a selected slide is effected by stopping the slide at the viewing position in a manner to cause the slide to rotate from a normally radial orientation to a peripheral orientation because of the momentum of preceding slide holders. A light located at the axis of the carousel permits viewing of the selected slide from a radial direction.

Each slide may include a plurality of distinct items such as the designations of drugs or inventory parts. Each item may have associated with it a related code adapted for optical detection and direct computer access when the selected slide is manipulated for viewing a selected item.

Accordingly, a feature of this invention is a closed slideway housing and endless loop arrangement of hinged together slide holders and means for imparting movement directly to all of the slides except those at a viewing position in the slideway.

DETAILED DESCRIPTION

Figure 1:
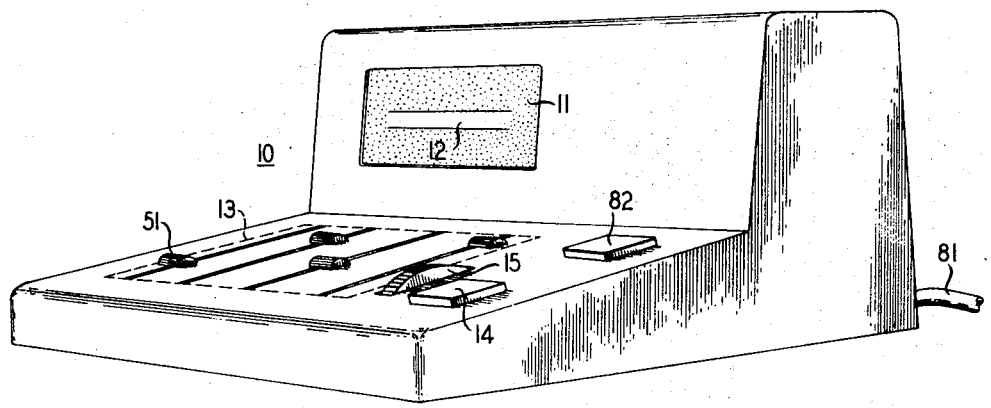
FIG. 1 is a plan view of a microfilm reader in accordance with this invention.

FIG. 1 shows a microfilm reader 10 in accordance with this invention. The reader includes a viewing screen 11 having an area 12 in which a selected item on a selected slide is viewed. The selection of a particular slide is made, illustratively, by means of a slide selector 13 with alphabetic and/or numeric representations in an arrangement similar to the familiar household card index for frequently called telephone numbers. Thumb wheel 15 permits the "fine tuning" to a particular item on a slide once a particular slide is selected. The reader also includes an item selection button 14.

Figure 2A:
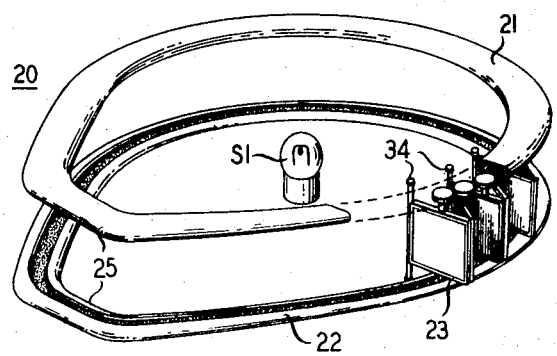
FIGS. 2a, 2b, 2c, and 3–6 are schematic illustrations of portions of the reader of FIG. 1.
Figure 2C:
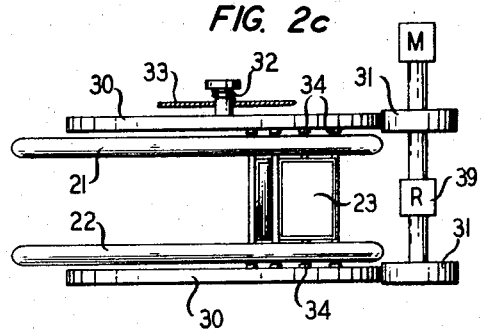
Figure 2B:
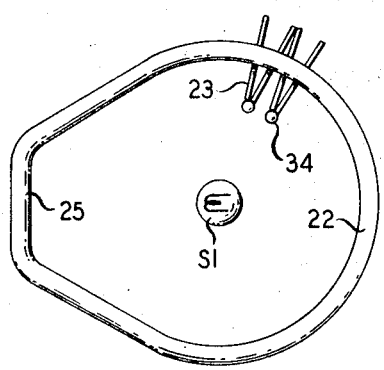

The reader houses a slide addressing arrangement 20, illustrated in FIG. 2, which includes a pair of spaced-apart tracks 21 and 22. The tracks are arranged (by structural members not shown) in the spaced-apart relationship depicted for providing a closed slideway in which slide holders 23 are free to move. The slide holders move sequentially into a viewing position 25 between source S1 of FIG. 2a and the area 11 of FIG. 1. In accordance with the invention, a slide in a generally radial orientation, shown in FIGS. 2a and 2b, is reoriented into a peripheral orientation essentially parallel to the plane of screen 11 of FIG. 1 for viewing.

The movement of the slides, the selection of a slide, and the reorientation of a selected slide at a viewing position in the tracks for effecting the desired viewing relationship is now discussed.

The movement of the ganged slide holders in the slideway defined by tracks 21 and 22 is effected, illustratively, by a friction driven disk 30 at the top as viewed in FIG. 2c. The disk is driven by a wheel 31. The wheel, in turn, is driven by motor M and is rotating at high speed at all times when the reader is on. A familiar on-off switch (not shown) is assumed present for rotating wheel 31 and for turning on the source S1. Disk 30 is supported by a spring 32 and a frame 33.

The holders are moved in the slideway when disk 30 engages pins 34 of FIG. 2c. This engagement is effected by the depression of selection button 14 of FIG. 1. When a selected slide is in the viewing position the selection button 14 is deactivated; the disk 30 rotates but not in contact with pins 34. Therefore, the holders are stationary. When a slide selection is made by selector 13 and the selection button 14 is pushed thereafter, a solenoid, not shown, forces disk 30 toward the pins and the slide holders move at a high speed.

The tracks 21 and 22 are not circular in shape as shown clearly in FIG. 2a. On the other hand, the driving disk 30 is circular. Consequently when slide holders pass to the extended (noncircular) part (25) of the track, as shown in FIG. 2b, they become free moving according to their momentum. The holders at the other end of the extended part of the track are, of course, driven by the disk.

Movement of the slides by engagement of disk 30 is permitted by the release of pairs of plates which hold a selected slide for viewing in the viewing position. We will assume that the slides are moved clockwise as viewed in FIG. 2a into the extended portion which defines the viewing position. The viewing position is defined further by normally spaced together spring plate pairs 40, 41, and 42, 43 of FIG. 3. The depression of selection button 14 of FIG. 1 not only causes driving disk 30 to engage pins 34 of FIG. 4 as stated above but, at the same time, also causes plate pairs 40, 41 and 42, 43 to separate a distance sufficient to permit passage of the shoulders 44 of slide holders 23 of FIG. 4 when those slides are radially oriented.

As will become clear, it may be desirable to move the holders either clockwise or counterclockwise to decrease access time. To this end, a second disk 30 may be arranged similarly as shown in FIG. 2c. A reverse direction coupling box R causes the bottom disk (as viewed) to rotate in the direction opposite to the top one. According to the selected code and the preceding position of the slide holder, either the top or the bottom disk drives the holder such that a minimum distance decision is made in positioning a newly selected slide as described hereinafter.

The selection operation for producing the foregoing slide holder movement is responsive to input information from selector 13 when button 14 is depressed and to position information from the slides themselves.

Figure 3:
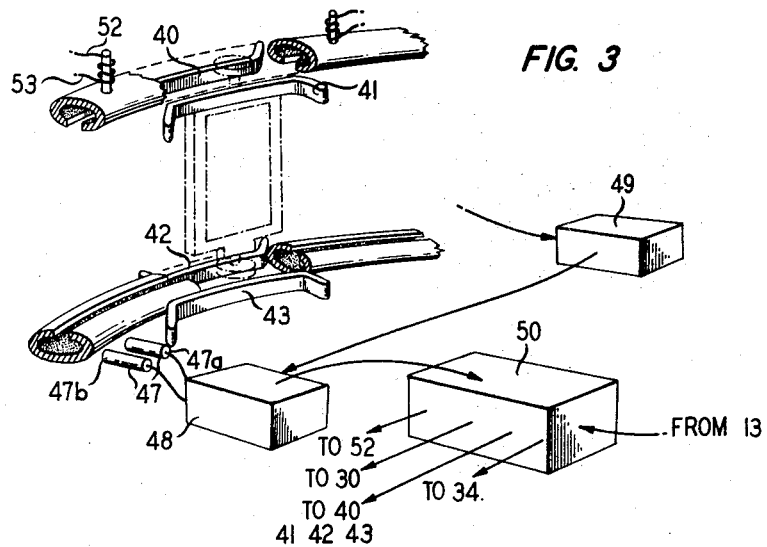
Figure 4:
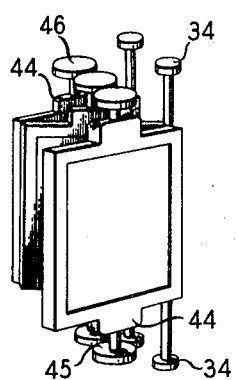

The sliding pinhead 45 (or 46) of each holder has a highly reflective surface. A photodetector 47 is positioned at a point near the viewing position as shown in FIG. 3 to detect the number of pinheads and, therefore, the number of slides passing this point. An electronic counter 48 counts this number providing an encoded output signal representative thereof.

One of the holders has a magnetic pinhead. A magnetic pickup head, represented as block 49 in FIG. 3, is disposed at the viewing position to sense the passing of that holder. The output of the head 49 sets counter 48 to zero.

The output code of counter 48 is applied to a set of inputs of a comparator 50 of FIG. 3.

A selected code from selector 13 of FIG. 1 is applied to a second set of inputs of comparator 50. To this end, selector 13 may comprise a plurality of coded contacts at each selector position for applying selected codes to comparator 50 when selection buttons 51 are moved to a selected item.

The comparator is responsive to the difference between the two input codes to provide a signal for moving the slide holders. When the counter output matches the selected input code, the comparator registers a null and the movement of the slide holders tops. The output (null) of comparator 50 is adapted to activate a solenoid 52 illustratively to insert a stop pin 53 into the rail, as shown in FIG. 3, to prevent the holders following the selected one from advancing.

Those holders preceding the selected holder continue to move however. This action causes the selected slide to rotate into the desired peripherally oriented disposition. At the same time, the output of comparator 50 deactivates the solenoid (not shown) which moves the driving disk 30 to engage pins 34 and deactivates the solenoids (not shown) for spacing apart the spring plate pairs 40, 41 and 42, 43 of FIG. 3. In response, the holders stop moving and the spring plate pairs close to secure the selected slide holder in the desired peripheral orientation.

It is clear, then, that when a particular slide is selected, all the slide holders engaged by a friction disk are moved and, illustratively, the motion of only the slide holder next subsequent to the selected one is blocked. Because of the momentum of the slide holder preceding the selected one, on the other hand, the hinged holder configuration at the viewing position is stretched into a peripheral orientation. The spring plate pairs clamp together on the top and bottom shoulders 44, respectively, of the selected holder.

Photodetector 47 actually may comprise two detectors 47a and 47b each arranged to detect the passage of a reflective surface. The sequence of activation of the two detectors determines the direction, clockwise or counterclockwise, in which the slide holders are moving. Counter 48 may be a reversible counter responsive to the outputs of detectors 47a and 47b for keeping track of the positions of the holders at all times.

Comparator 50 may be of a type responsive to the sign of the difference between the selection code and the counter code to provide a first or second output signal (or a null) in response to first or second differences (or a match) between a selection code and the counter output depending upon which is larger. These signals determine which direction the slide holders move by activating a solenoid (not shown) to advance the proper disk 30 to engage pins 34 of holders 23 as shown in FIGS. 2a and 2c. Operation is analogous to that described above regardless of the disk employed. An additional pin 53 is shown in FIG. 3 for stopping the movement of slides moving counterclockwise, as viewed in that figure, when the comparator output dictates such movement.

We have now positioned a selected slide for viewing and can turn our attention to the selection of a particular item on that slide.

Figure 5:
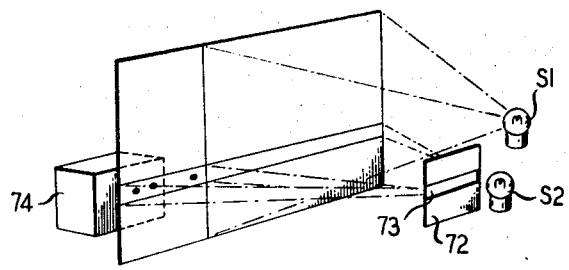

In the simplest arrangement, items are listed alphabetically from top to bottom on each slide in the viewing position. Source S1 is shown in FIG. 5 illuminating the slide. Auxiliary source S2 is occluded by a gate 72 with a slot 73. This gate may be of cylindrical shape encompassing the auxiliary source S2. The gate is mechanically coupled (by means not shown) to the vernier selector (thumb wheel) 15 of FIG. 1. The slot of gate 72 permits a colored light or a dim light to superimpose on the desired item such that this item "stands out" on the viewing screen. The vernier selector 15 of FIG. 1 moves this auxiliary light beam up and down the screen.

In a more complicated arrangement, several complete sets of items can be stored on a selected slide. For accessing such an arrangement, displacement of light from main light source S1 in both the X and Y directions is required. One familiar mechanism for light displacement along an X and Y axes is a square-apertured shield (not shown) between source S1 and the selected slide holder. Such apparatus is well known in the art.

It is contemplated that the arrangement of FIG. 1 be adapted for direct computer input. To this end, each item of information on a slide has associated with it a coded set of opaque spots to interrupt light from source S2 as shown for a selected item in FIG. 5. The resulting light pattern is detected by light detecting apparatus 74 for direct computer access via transmission means 81 of FIG. 1 in response to the depression of a button 82 in FIG. 1.

The selection and fine tuning of a slide to position a selected item for viewing has now been explained along with the reorientation of a selected slide responsive to the depression of the selection button 14 of FIG. 1. The selection button is reset, in a well-understood manner, for a next operation each time comparator "recognizes" the positioning of a selected holder in the viewing position.

Each slide in accordance with this invention is conveniently the size of a conventional microfilm or slide transparency. Such slides store, typically, one hundred items of information and may be adapted for storing a three by three array each of a hundred items in a well-understood manner. Moreover, each slide holder is about one-eighth of an inch thick. A slideway having a diameter of 12 inches, accordingly, is capable of storing, ideally, about 300 slides or at least 30,000 individual items up to about 270,000 items. Of course, space must be allowed to permit sufficient movement of slides to reorient a selected slide for viewing.

Access to a selected item, nevertheless, is afforded on the order of seconds. Fast access is enabled by the arrangement in accordance with this invention which permits fast movement of all but the slides in a viewing position and permits viewing without removing the slide from its stored position to a separate location, an action which often causes jamming in conventional home slide projectors.

Figure 6:
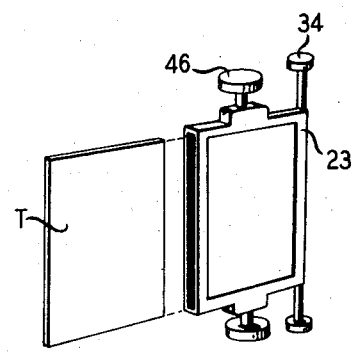

Not only is access time low, but updating is fast and inexpensive as well. The cost of a new transparency, of course, is low as is well known. Each slide holder 23 of FIG. 2, in accordance with this invention, is adapted for simple updating by permitting a transparency T to slidably engage the holder as illustrated in FIG. 6.

The holders may be numbered or otherwise coded for correspondence with coded slides to facilitate updating.

What has been described is considered only illustrative of the principles of this invention. Various and other embodiments can be devised by those skilled in the art in accordance with those principles within the spirit and scope of the invention.

What is claimed is:

1. An optical reader including a closed slideway having an axis, a closed loop of hinged-together slide holders having normally radial orientations and free to move within said slideway, first means for defining a viewing position in said slideway, second means for providing positional information for said holders in said slideway, third means for providing slide holder selection information, fourth means responsive to selection information and said positional information for imparting motion simultaneously to all of said slide holders in said slideway except at said viewing position, and fifth means responsive to said positional and selection information for stopping a selected slide holder in said viewing position in a manner such that the movement of the nonselected slides is operative to rotate the selected holder from said radial to a peripheral orientation.

2. An optical reader in accordance with claim 1 including a first light source at said axis for illuminating said selected slide holder.

3. An optical reader in accordance with claim 2 including a second light source at said axis and means for directing light from said second source at only a portion of the slide in said selected holder.

4. An optical reader in accordance with claim 2 wherein said closed slideway includes a circular first portion and a noncircular second portion for defining said viewing position.

5. An optical reader in accordance with claim 4 wherein said fourth means comprises a motor driven disk for engaging said holders in said first portion in response to a selection signal.

6. An optical reader in accordance with claim 3 wherein each of said holders bears a highly reflecting pin, and said third means comprises counter means for counting the passage of said pins at a first position.

7. An optical reader comprising a closed slideway having a circular first portion with an axis, and an extended noncircular portion defining a viewing position, a plurality of transparency holders hinged to one another in an endless loop and free to move within said slideway through said viewing position, means for imparting motion simultaneously to all of said holders within said circular portion, and means for stopping the movement of a selected holder at said viewing position in a manner such that the movement of the nonselected slides is operative to rotate the selected holder for viewing.

8. An optical reader in accordance with claim 7 including a source of light at said axis and including means for directing light from said source at a selected portion of a selected transparency.

9. An optical reader in accordance with claim 8 wherein each of said holders bears an indication, and means for counting the number of indications passing a first position for providing slide position information.

10. An optical reader in accordance with claim 9 also including normally spaced together plate pairs at said viewing position, and means responsive to a selection signal for moving said plates apart for permitting passage of said holders.

11. An optical reader in accordance with claim 10 wherein said means for imparting motion to said holders comprises a circular disk, and means responsive to said selection signal and said position information engaging only those holders which occupy said circular portion.

12. An optical reader in accordance with claim 11 wherein said means for imparting motion comprises means responsive to said selection signal and said position information for moving said holders in first or second directions.

* * * * *